(No Model.)
C. H. WARNER.
VELOCIPEDE.
No. 283,306.
Patented Aug. 14, 1883.
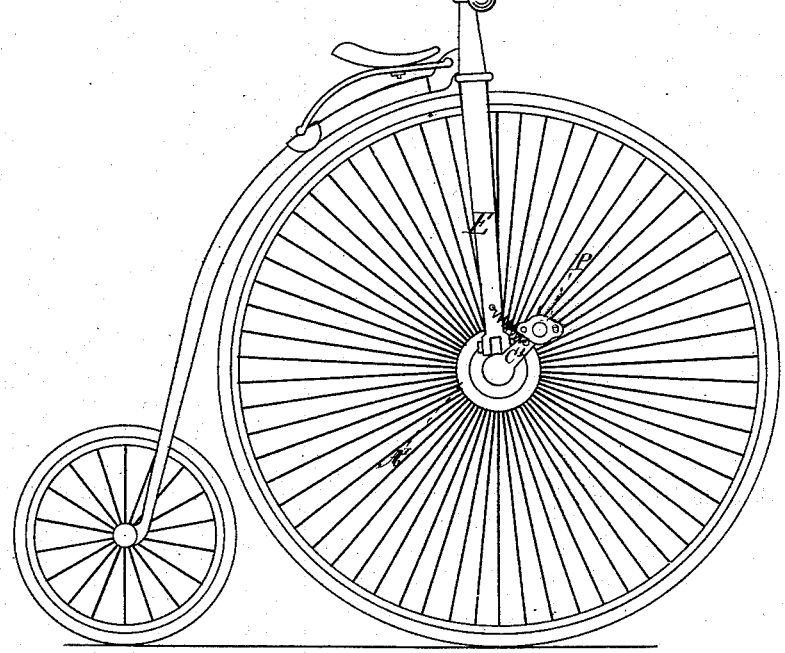
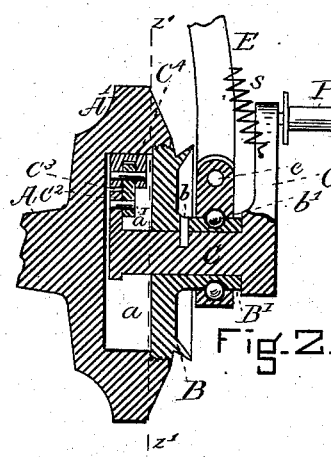
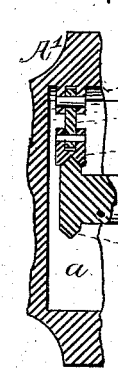
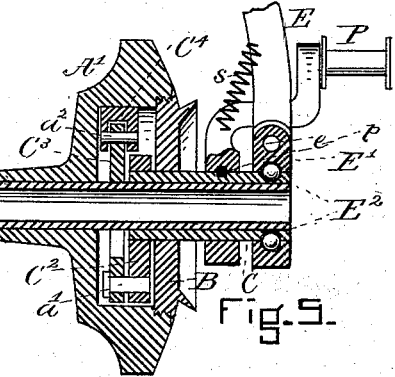
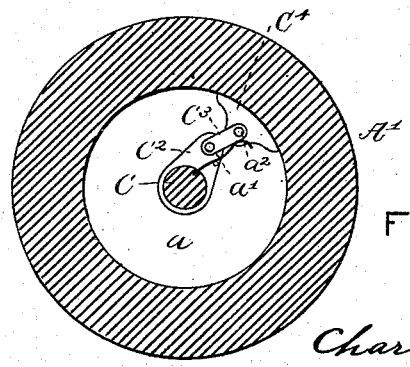
WITNESSES
H. I. Nash.
E. R. Benson
INVENTOR
Charles H. Warner
By Charles E. Pratt
Atty

UNITED STATES PATENT OFFICE.

CHARLES H. WARNER, OF BOSTON, MASSACHUSETTS, ASSIGNOR OF ONE-HALF TO THE POPE MANUFACTURING COMPANY, OF SAME PLACE.

VELOCIPEDE.

SPECIFICATION forming part of Letters Patent No. 283,306, dated August 14, 1883.

Application filed June 21, 1882. (No model.)

*To all whom it may concern:*

Be it known that I, CHARLES H. WARNER, of the city of Boston, in the county of Suffolk and State of Massachusetts, have invented certain new and useful Improvements in Velocipedes, of which the following is a specification.

My improvements relate more particularly to what may be called the "driving mechanism" for bicycles and tricycles or other velocipedes; and the nature of them will be apparent from the following description, taken in connection with the accompanying drawings, in which—

Figure 1 represents in side elevation a bicycle or two-wheeled velocipede containing my improvements in one form. Fig. 2 shows in vertical section a portion of the driving-wheel, front fork, and crank. Fig. 3 shows in vertical section parts of a similar hub and shaft, with modifications of clutch-connections. Fig. 4 shows in part elevation and part section on the lines $z\ z$ the parts on the left of that line in Fig. 2. Fig. 5 shows in vertical section on the line of the axis a shaft, hub, sleeve, friction-clutch connections, fork, and crank embodying my improvements in a modified form.

A is the axle of a driving-wheel of a velocipede.

A' is the hub of the wheel, or one of the flanges of the hub of a suspension-wheel.

B is a cap or circular plate concentric with the hub or flange A', and which may be connected therewith by means of screw-threads, as shown in the figures.

B' (shown in Fig. 2) is a projection or sleeve, which may be in one piece with the disk B, or may be in a separate piece and threaded or otherwise fastened thereto.

C is a crank-shaft; C', a crank; $C^2$, a projection or arm on the crank-shaft C. $C^3$ is a link. $C^4$ is a shoe or friction-block.

E is a front fork; E', a bearing-box; $E^2$, a sleeve on the axle and within the box.

P is a pedal on the crank C. $a$ is a cavity in the flange A'. $a'$ is a pivot or pin connecting the arm $C^2$ with the link $C^3$. $a^2$ is a similar pivot connecting the link $C^3$ with the shoe $C^4$.

$b$ is a slot in the extension of the cap or disk B, and corresponding with a similar slot or hole in the crank-shaft C, in which a pin or screw may be inserted to key the two together.

$b'$ are balls, which may be used in the bearing-box to make an anti-friction bearing.

$e$ is a perforated lug by which the bearing-box may be attached to the front fork, E.

In Fig. 3, showing a modification, $c$ is a pin or screw. $c'$ is a swinging arm pendent from the pin $c$. $c^2$ is a shoe or friction-block attached to the swinging arm. $c^3$ is a beveled disk or flange attached to the crank-shaft C, and $c^4$ is a lug projecting from the inner part of the hub or flange A', from which the friction-block is suspended. $s$ is a coiled spring attached at one end to the front fork, E, and at the other to the crank C'. $p$ is a key by which the crank C' is attached to the crank-shaft C.

In the form of contrivance shown in Fig. 2, the flange or hub A' may be made solid with the axle A, or may be made separate and screwed or sweated or otherwise attached thereon. The cap or disk B forms, when in place, not only a dust-cap and cover to protect and conceal the cavity $a$, and the parts of the mechanism therein, but also serves as a part of the flange, and so affording, by means, in part, of an outward projection toward the crank, a bearing for the crank-shaft C within, and for the wheel in the bearing-box at the foot of the fork E on the outside. In this form the crank may be made solid with the crank-shaft, as shown, or it may be keyed thereon, the crank being outside the fork or on the opposite side from the flange A'. When the slots $b$ are together, as shown in Fig. 2, a pin or key or screw may be inserted, and the crank-shaft C and the disk B fastened together thereby, when the crank and its shaft and the flange or hub and axle will revolve together, (the spring $s$ being disconnected or removed,) and the operation of the contrivance will be the same as in the ordinary crank-machine; but if the pin be removed from the slots at $b$, and the spring $s$ be in place, as shown, the crank C' will operate as a lever through so much of an arc as may be desired, and when pressure is applied at the pedal P, the shaft C will be made to revolve, carrying the arm $C^2$ forward, and the latter, operating through the link C³, will press the shoe or friction-block C⁴ against the flange in the cavity a, and cause the flange A' and the wheel of which it forms a part to revolve also through the same angle as the crank or lever C'. When the pressure is removed from P, the spring s operates to draw the crank or lever C' back to the fork E, and that draws back the arm C² and the block C⁴ with it, when pressure may again be applied, and the same operation be had as before. The length of the link C³ and the block C⁴ is greater than the distance between the arm C² and the interior wall of the flange in the cavity a, and the block C⁴ is placed and kept forward of a line through the centers of the shaft C and the pin a', so that the link C³ operates as a brace to force the block C⁴ against the flange when the lever C' is pressed forward, as well as to carry the block, and therefore the wheel, forward at the same time with the arm C².

It is obvious that the same mechanism is to be placed on the opposite side of the wheel, so that the two can be used alternately or simultaneously, at choice of the operator, it being intended that the pedal P shall be operated by one foot, and the similar pedal on the opposite side of the wheel operated by the other foot. Modifications of this arrangement are shown in Fig. 5. The axle A may be a hollow shaft instead of a solid one, and whether hollow or solid may extend through the flange and to the outside of the fork.

The fork E may be outside of the crank C', which, being curved, as shown in Fig. 5, so as to bring the pedal into an accessible position, may be attached to the crank-shaft C, between the fork and the flange, the crank-shaft in this case being hollow and inclosing the end of the axle. With this construction it is obvious that the crank C' can only operate as a lever, and cannot make a full revolution. In this Fig. 5, another form of connection between the arm C² and the friction-block is shown, the link C³ being enlarged into the form of a circular disk, surrounding the axle and connected with the friction-block C⁴ by the pin a² at the opposite side from its connection with the arm C² by the pin a'. The operation, however, of this part of the mechanism is the same in either form, the toggle-joint effect being preserved by placing the friction-block forward of a line through the centers.

In Fig. 3 still another modification of the form shown in Fig. 2 appears, where the crank-shaft, instead of bearing an arm, C², connected by link and pivots with the friction-block, has a beveled wheel, c³, on a true center, engaging when turned forward, and idle when turned backward, with the friction-block c² attached to the pendent arm c', pivoted in the flange A' or an inward projection therefrom, and this is hung so that a line through the centers of the pivots c and the block c² does not fall on the center of the shaft C, but backward of it. It is obvious that with either this form shown in Fig. 3 or the form shown in Fig. 2, if the spring s be removed, the crank C' may be operated as a fixed crank with the wheel, so long as the pressure is continued in one direction, without any key being inserted in the slots at b; but in that case it would be impracticable to use it as a foot-crank, since there not only could be no back pedaling, but when the crank was once down to its utmost the foot would not naturally bring the crank up through the whole of the revolution, and the engagement of the friction-block would be lost beyond recovery, making either the spring s or the key at b necessary for efficient use.

I have described my contrivance only as attached to a bicycle, but it is obviously equally well adapted for attachment to tricycle-wheels, or the wheels of other velocipedes propelled by the feet, or even in other positions or machines where the hands or other means are used for rocking the crank-lever C'. Heretofore it has been customary to use cranks fixed to the axle of the driving-wheel for propelling, wherewith the pedal P must be constantly driven through its full revolution; and other devices have been sometimes used either with a revolving crank or with rocking levers embodying gear-wheels or ratchets and pawls with drum and strap or other connections with greater or less complication and disadvantage.

I claim for advantages with my construction that the power can be applied at the end of the crank or the periphery of a wheel fixed on the shaft C through a part of a revolution without following it through a whole revolution, so that the operative action may be taken more rapidly or through the arc of a circle of longer radius, and so with better leverage; that the contrivance in either form that I have shown is noiseless, compact, and simple, and protected from dust; that it is easily convertible from friction-crank mechanism to direct crank action at the will of the operator, which conversion may be of advantage under some circumstances of use, and that for application to tricycles, as well as to other velocipedes it has great advantage in neatness and elegance of structure, as well as in economy of mechanism over other devices heretofore in use.

I claim as new and of my invention—

1. In a velocipede, the combination of crank-shaft C, crank C', arm C², connecting-link C³, and shoe C⁴, constructed and adapted to operate the driving-wheel, substantially as and in the manner set forth.

2. The combination of axle A, flange A', disk B, and shaft C, with mechanism for revolving the same, and arm C², link C³, and shoe C⁴, substantially as shown and described.

3. A convertible direct crank and clutch mechanism for driving a velocipede, consisting of a crank-shaft and its crank, a clutch operating from the shaft, a cylindrical projection having a bearing for said shaft within and a bearing for the wheel without, and means for connecting said shaft and said projection rigidly together, all constructed and adapted to be combined with and operate upon the frame and the driving-wheel of a velocipede, substantially as shown and described.

4. In a velocipede, the disk B, adapted at one side for combination with the flange of the wheel, and on the other side a projection, B', constructed to afford a bearing for a shaft within and a bearing-box without, substantially as set forth.

CHARLES H. WARNER.

Witnesses:
C. S. HOWARD,
H. I. NASH.